Figure 1:
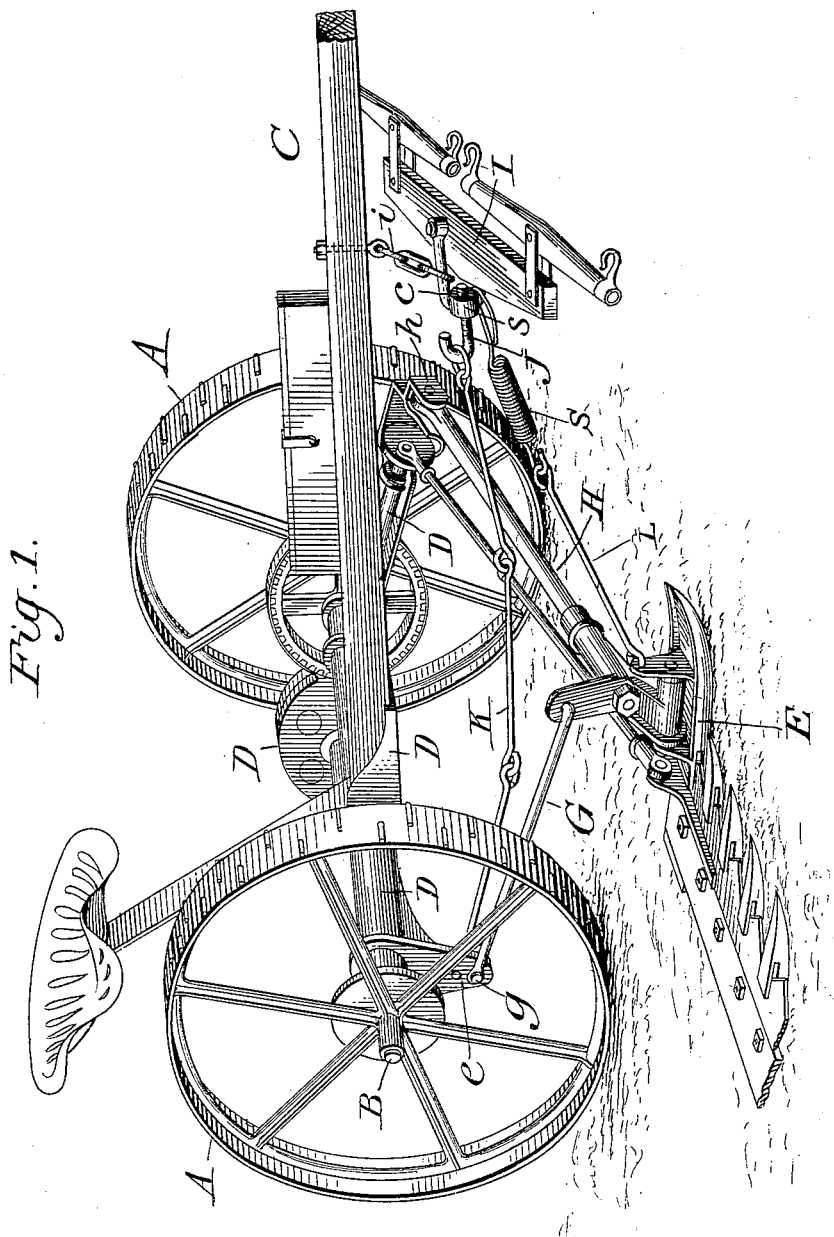

No. 638,714. Patented Dec. 12, 1899.
H. L. HOPKINS.
MOWING MACHINE.
(Application filed Oct. 19, 1898.)
(No Model.) 2 Sheets—Sheet 1.

Witnesses:
D. W. Edelin.
E. M. Young.

Inventor:
H. L. Hopkins
By his attorneys
Eimer & Goldsborough

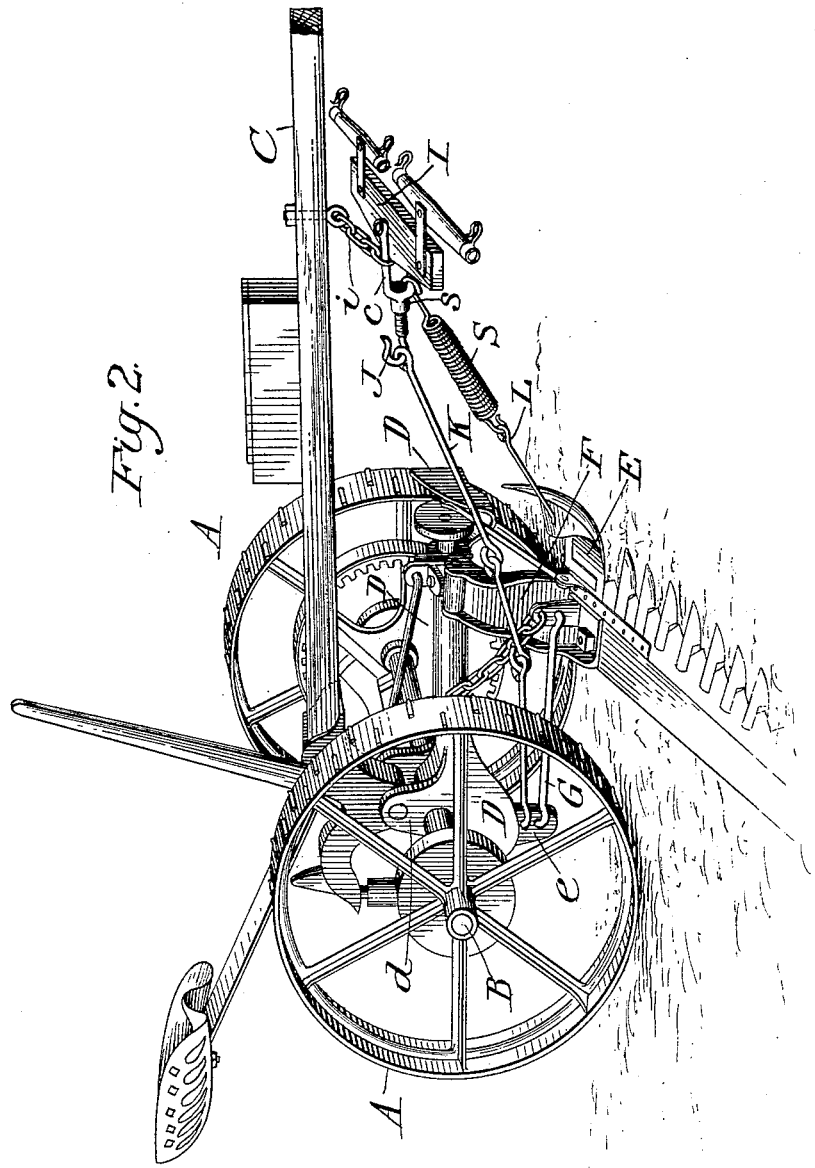

United States Patent Office.

HARVEY L. HOPKINS, OF MOLINE, ILLINOIS, ASSIGNOR OF TWO-THIRDS TO CHARLES H. POPE, OF SAME PLACE, AND MERWIN D. HOPKINS, OF WEST EATON, NEW YORK.

MOWING-MACHINE.

SPECIFICATION forming part of Letters Patent No. 638,714, dated December 12, 1899.

Application filed October 19, 1898. Serial No. 694,004. (No model.)

*To all whom it may concern:*

Be it known that I, HARVEY L. HOPKINS, a citizen of the United States, residing in Moline, in the county of Rock Island and State of Illinois, have invented certain new and useful Improvements in Mowing-Machines; and I do hereby declare the following to be a full, clear, and exact description of the invention, such as will enable others skilled in the art to which it appertains to make and use the same.

The object of the invention is to diminish the draft of mowing-machines by lessening the weight and friction of the cutting apparatus on the ground and by counterbalancing the force with which the gearing tends to depress the main frame, throwing its weight in one class of machines onto the cutting apparatus and in another class onto the tongue and necks of the horses. The main frames of these machines carry the counter-shaft, gearing, cutter-operating shaft, &c., and in one of the classes above referred to the tongue is rigidly secured to the frame, so that the latter rises and falls with it and, vice versa, the tongue rises and falls with the frame. In this class the requisite flexibility of the cutting apparatus is obtained by connecting it with the frame by means of certain hinged bars constituting what is known as a "coupling-frame," which bars are jointed to the frame at one end and have the cutting apparatus hinged thereto at the other. In the other class of machines referred to the tongue is not rigid with the frame, but is either pivoted thereto or upon the axle, and the cutting apparatus gets its flexibility from the rising and falling of the frame and its single-joint connection therewith. In either class the shoe of the cutting apparatus rests upon the ground and is independent of the tongue; but in one class it is directly connected to the frame by a single joint and the frame rises and falls with it and in the other it is connected to the frame by the double-jointed coupling-bars, which form part of said cutting apparatus, and the frame is not affected by its movements. In these machines the draft of the tongue comes on the axle, and the cutting apparatus being in front of the axle the forward motion of the machine tends to make it bear harder on the ground than its mere weight would do. The force exerted by the main wheels to turn the gearing when the machine is in operation also tends to press the frame downwardly in front of the axle. If the frame is rigid with the tongue, this adds so much extra weight on the necks of the horses. If the frame is independent of the tongue and simply swings on the axle, it adds this weight to the shoe of the cutting apparatus and increases its friction on the ground. In either case the draft of the machine is increased and the flexibility of the cutting apparatus impaired; and it is the object of my invention to avoid the above-described difficulties by utilizing the draft of the team to counterbalance the increased weight and friction of the cutting apparatus and the weight added to the tongue by the resistance of the cutter-operating gearing, and it is incidental to the means by which I accomplish these results that practically the whole weight of the machine is carried on the axle, thereby greatly increasing the tractive power of the wheels.

One embodiment of the invention is illustrated in the accompanying drawings, forming part of this specification, wherein—

Figure 1 is a perspective of a mower of the class first above described, and Fig. 2 a similar view of a machine of the other class.

The invention is not concerned with the general construction of these mowers, the form of the frame, the arrangement and construction of the gearing, or the type of cutting apparatus employed; but it has reference solely to the draft devices and the manner of connecting it or them with the cutting apparatus and main frame, respectively, and which I will now proceed to describe and claim.

As the general structure of both types of machine shown in the drawings is old and well known, no detailed description thereof is required, it being sufficient for the purposes of this application to explain that A denotes the wheels, B the axle, C the tongue, D the main frame, and E the cutting apparatus. In the form shown in Fig. 1 the tongue C is rigidly secured to the main frame, and this frame in each construction carries the counter-shaft, the cutter drive-shaft, the gearing, &c., as above described and as is well understood. In the form shown in Fig. 2 the tongue C is pivotally secured to projections $d$, rising from the main frame just above the axle; but, as before stated, it is sometimes pivoted to the axle itself or some other part of the frame. E denotes the usual inner shoe of the cutting apparatus. This shoe is rigid with the arm F, which is pivoted directly at its upper end to the frame in the machine shown in Fig. 2; but in the one illustrated in Fig. 1 it is connected with the frame by means of the thrust-bar G and hinged bar H, these bars being pivoted at one end to the frame at $g$ and $h$, respectively, and at the other to the shoe, thereby uniting the shoe with the frame by means of a double-hinge-jointed connection. In the other form of machine the arm F is connected to the frame by a single joint at its upper end and the frame is sleeved on the axle, as usual, so that its front end rises and falls with the shoe. The thrust-bar G is also used with this construction to stiffen and hold the arm F; but the connection between the arm, the frame, and the shoe is such that the weight of the frame is borne by the shoe, whereas in the other construction it is carried by the tongue.

With this general explanation I will now proceed to describe my improvements, and it may be noted here that so far as the following description is concerned reference may be made to either figure of the drawings.

The letter I denotes a whiffletree or evener constituting the draft device. It is supported by the tongue, and the connection is such as to permit it to move lengthwise of the tongue for a limited distance. The connection may be of any form or kind that will permit this movement, and in the drawings I show a chain $i$ depending from the tongue and connected at its other end to the clevis $c$ of the evener. This clevis instead of being plain, as usual, is provided with a socket $s$, having an internal screw-thread, and screwing into this socket is the exteriorly-threaded shank of a hook J, the object of this arrangement being to provide an adjustment of the hook toward and from the clevis and whiffletree.

K denotes a flexible link-rod reaching from a portion $e$ of the main frame depending below the axle B and being connected to the hook J, thus forming an adjustable connection between the whiffletree and the main frame, the tendency of which, owing to the connection with the frame being with a part that is lower than the axle, is to lift the front portion of the frame upward as the draft of the team pulls on the evener. The frame being sleeved upon the axle, as before explained, and the downward extension $e$ being, in effect, a crank, the pull of the team comes directly on the main frame and tends in the manner just described to raise the front end of the frame. Of course the amount of this tendency of the draft ought to vary in different machines and is determinable largely by the weight of the shoe, the frame, the connections uniting them, and the character of the gearing. It is readily adjustable by varying the length of the depending part $e$ of the frame or by connecting the rear end of the rod K at points nearer to or farther from the axle, and it is apparent that a point of connection may easily be found where the draft on the part $e$ through the rod K will exactly balance the tendency to turn the front end of the frame downward which the gearing exerts. It is not intended that the connections should be so arranged as to actually lift the frame, but only that they should balance or counteract the tendency of the gearing to press it down harder on the shoe and perhaps carry a portion of the weight of the frame itself and its connected parts.

Referring now to the other draft connection, L denotes a link-rod leading from the shoe upward to the whiffletree, where it is connected to the clevis $c$. Included in this rod is a spiral spring S, whereby the connection is made a yielding one. The invention is not limited to any particular point of connection of the rod with the shoe or other part of the cutting apparatus, but it is preferable that it be near the front part, so as to more effectively prevent the digging of the guards into the ground. In Fig. 1 it is shown connected to a short post rising from the shoe and in Fig. 2 to a web or fin formed on the front end of the shoe. It may, however, be connected to any other point.

Such being the construction of my improved counterbalancing draft device, I will now explain its operation and advantages.

In both classes of machines above described it is essential that the heavy parts bearing down on the ground and on the tongue should be so counterbalanced that the cutting apparatus will not rake the ground and shingle the grass and that the pressure upon the necks of the horses should be as light and uniform as possible.

To properly counterbalance the inner shoe and the cutting apparatus, including the mere weight of the frame pressing on it, as well as to counteract the inherent tendency of the guards to dip and dig into the ground, an unvarying amount of draft should be applied to the inner shoe. The exact amount required to do this and the proper point of connection with the shoe-draft depend upon the weight and character of the parts and will be properly proportioned in the manufacture of the machine or made subsequently adjustable. As a rule the adjustment should be such that the draft will be just sufficient to draw substantially the whole cutting apparatus, so that the labor of pushing the cutting apparatus is taken off the frame and thrust-bar.

As the tendency of the gearing to depress the front end of the frame is proportional to the resistance offered by the cutting apparatus, it will be apparent that to counterbalance this tendency the amount of draft should vary with the varying resistance which the gearing has to overcome.

So far as I am aware there has hitherto been but one counterbalanced draft connection employed in mowing-machines, and this connection has been made sometimes with the shoe, sometimes with the hinged bar, and sometimes with the frame or other part. In none of these single-draft connections, however, have the best results been obtained, for the reason that it has not been possible by such connection to counterbalance both the frame and the cutting apparatus; but I have discovered that by employing a movable draft device with a branch connection to one of the parts and another branch connection to the other part and arranging and combining this connection and its branches in the manner hereinbefore described I am enabled to utilize the draft of the team for counterbalancing purposes and by properly distributing this force to obtain the desired counterbalancing effect on the machine as a whole.

Referring again to the drawings, it will be noted that the draft of the team is at first exerted upon the spring-rod extending to the shoe and that this continues until the spring is stretched sufficiently to straighten the link-rod K, when the remainder of the draft comes on the main frame at a point under the axle. It is apparent that the force tending to lift the shoe is an elastic one and that the draft of the link-rod K tends to revolve the main frame on the axle and lift its front end. The two connections thus combine to produce the desired result—viz., the counterbalancing of the weight of the downwardly-pressing parts as a whole. The draft exerted on the rod K does not tend to lift the axle, and thereby decrease the tractive power of the wheels, but operates to transfer the weight of the frame to the axle, thereby diminishing the draft of the machine and at the same time increasing the traction of the wheels. The draft on this connection will increase and decrease with the amount of resistance offered to the operation of the gearing, and as this resistance varies with the character of the ground and the cutting it is apparent that the amount of lifting force exerted by the rod will also vary; but the draft on the shoe connection will remain constant, for the reason that when the spring stretches sufficiently to tighten the frame connection there can be no additional force exerted on the shoe connection.

As before described, the object of the screw-hook J is to adjust the length of the link-rod K, and it is obvious that by this means the length of this connection is not only actually varied, but the two connections are adjustable relatively to each other, for if the rod K be lengthened it will require a further stretching of the spring S before the draft comes on the main frame, and the reverse is of course equally true—viz., that by shortening the length of the rod K the spring will not be stretched so much. By means of this adjustability of the connections with the whiffletree I am enabled to obtain the required division of draft between the main frame and the cutting apparatus.

Although I have so far only shown and described the spring as being included within the connection leading to the shoe, I do not deem the invention limited to its inclusion in such connection, but intend my claims to cover the arrangement without regard to which of the connections is the elastic one. Neither do I desire to be understood as restricting the invention or claims to the particular construction of draft device herein shown and described or to the particular connection of the same with the tongue or the specific form of spring-rod and link-rod. Neither do I intend to limit my claims to one of the connections being elastic and the other inelastic, nor to the fact that either or both the connections are adjustable, as both said connections may be elastic or inelastic, and either, both, or neither may be adjustable, and though I show and describe the connection with the main frame as being made at a point below the axle I do not thereby mean that it is necessarily to be directly under the axle.

What I claim, and desire to secure by Letters Patent, is—

1. In a mowing-machine, the combination with the main frame and the cutting apparatus, of a draft device connected with each of said parts, one of the connections being with an extension of the main frame below the axle.

2. In a mowing-machine, the combination with the main frame and the cutting apparatus, of a draft device connected with each of said parts, one of the connections being with the shoe, and the other with an extension of the main frame below the axle.

3. In a mowing-machine, the combination with the main frame and the cutting apparatus, of a draft device connected with each of said parts, one of the connections being with the shoe, and the other with an extension of the main frame below the axle, and one of said connections being elastic.

4. In a mowing-machine, the combination with the main frame and the cutting apparatus, of a draft device connected with each of said parts, one of said connections being with the shoe, and the other with an extension of the main frame below the axle, and said connections being adjustable relatively to each other.

5. In a mowing-machine, the combination with the main frame and the cutting apparatus, of a draft device connected with each of said parts, one of the connections being with the shoe, and the other with an extension of the main frame below the axle, the shoe connection being elastic, and the main-frame connection being inelastic.

6. In a mowing-machine, the combination with the main frame and the cutting apparatus, of a movable whiffletree, an inelastic connection from said whiffletree to a point on the main frame below the axle, an elastic connection from the whiffletree to the shoe of the cutting apparatus, and an adjustable hook interposed between the whiffletree and the inelastic connection.

In testimony whereof I affix my signature in presence of two witnesses.

HARVEY L. HOPKINS.

Witnesses:
C. H. POPE,
M. B. POPE.